United States Patent
Rienecker et al.

(10) Patent No.: US 10,059,262 B2
(45) Date of Patent: Aug. 28, 2018

(54) STORAGE DEVICE FOR A VEHICLE WITH AN IMAGE-CAPTURING DEVICE

(71) Applicant: Brose Fahrzeugteile GmbH & Co. Kommanditgesellschaft, Coburg, Coburg (DE)

(72) Inventors: Maik Rienecker, Meiningen (DE); Markus Bauernfeind, Coburg (DE); Markus Treichl, Meeder (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 153 days.

(21) Appl. No.: 15/102,859

(22) PCT Filed: Dec. 10, 2014

(86) PCT No.: PCT/EP2014/077108
§ 371 (c)(1),
(2) Date: Jun. 17, 2016

(87) PCT Pub. No.: WO2015/086633
PCT Pub. Date: Jun. 18, 2015

(65) Prior Publication Data
US 2016/0304030 A1 Oct. 20, 2016

(30) Foreign Application Priority Data
Dec. 11, 2013 (DE) .................. 10 2013 225 670

(51) Int. Cl.
*H04N 7/18* (2006.01)
*B60R 1/00* (2006.01)
(Continued)

(52) U.S. Cl.
CPC .................. *B60R 1/00* (2013.01); *B60R 7/04* (2013.01); *B60R 11/00* (2013.01); *B60R 11/04* (2013.01);
(Continued)

(58) Field of Classification Search
CPC . H04N 7/181; H04N 7/18; B60R 1/00; B60R 7/04; B60R 11/00; B60R 11/04;
(Continued)

(56) References Cited

U.S. PATENT DOCUMENTS

| 2005/0248170 A1 | 11/2005 | Kawamoto et al. |
| 2009/0312864 A1 | 12/2009 | Hanel |
| 2013/0285603 A1* | 10/2013 | Zeinstra ................ H02J 7/0004 320/108 |

FOREIGN PATENT DOCUMENTS

| CN | 1695982 A | 11/2005 |
| DE | 3700614 A1 | 7/1988 |
(Continued)

OTHER PUBLICATIONS

Machine translation of DE 102004063138A1 previously submitted on Jul. 11, 2016, 8 pages.
(Continued)

*Primary Examiner* — Sherrie Hsia
(74) *Attorney, Agent, or Firm* — Lewis Roca Rothgerber Christie LLP

(57) ABSTRACT

A storage device for a vehicle which has a plurality of compartments for storing objects is provided. The device comprises a receptacle space with a removal opening, at least one storage unit which is accommodated inside the receptacle space and has at least one compartment, an adjustment device by means of which the at least one storage unit can be adjusted within the receptacle space, with the result that whether a specific compartment of the storage
(Continued)

device is accessible to a user via the removal opening depends on the position of the storage unit, an electronic memory, an image-capturing device by means of which at least one image of contents of one of the compartments can be produced and stored in the memory and a control unit by means of which an image produced by the image-capturing device and stored in the memory can be displayed on a display device.

15 Claims, 6 Drawing Sheets

(51) Int. Cl.
*B60R 11/00* (2006.01)
*B60R 7/04* (2006.01)
*B60R 11/04* (2006.01)
*G06K 9/00* (2006.01)

(52) U.S. Cl.
CPC .. *G06K 9/00791* (2013.01); *B60R 2011/0003* (2013.01); *B60R 2011/007* (2013.01); *B60R 2300/8006* (2013.01)

(58) Field of Classification Search
CPC ....... B60R 2011/0003; B60R 2011/007; B60R 2300/8006; G06K 9/00791
USPC ......................................................... 348/148
See application file for complete search history.

(56) References Cited

FOREIGN PATENT DOCUMENTS

| | | | |
|---|---|---|---|
| DE | 3921105 | A1 | 1/1991 |
| DE | 44 09 562 | C1 | 4/1995 |
| DE | 100 27 373 | A1 | 12/2001 |
| DE | 10 2004 063 138 | A1 | 7/2006 |
| DE | 102012009411 | A1 | 11/2013 |
| EP | 1 854 672 | A2 | 11/2007 |
| JP | 4032401 | | 2/1992 |
| JP | 2004277062 | A | 10/2004 |
| JP | 2005224309 | A | 8/2005 |
| JP | 2009541179 | A | 11/2009 |
| JP | 2012240826 | A | 12/2012 |

OTHER PUBLICATIONS

Machine translation of DE 44 09 562 C1 previously submitted on Jul. 11, 2016, 4 pages.
Chinese First Office Action dated Mar. 15, 2017 and Search Report issued in corresponding CN Application No. Application No. 201480067726.5, 5 pages, with English Translation, 5 pages.
Japanese Notification of Reasons for Rejection issued in corresponding Japanese Patent Application No. 2016-538761 dated Aug. 1, 2017, 4 pages, with English translation, 3 pages.
International Search Report, corresponding to PCT/EP2014/077108, dated Feb. 26, 2015, 4 pages.
JP Notification of Reasons for Rejection dated Jun. 19, 2018 issued in corresponding Appl. No. 2016-538761, 3 pages.

* cited by examiner

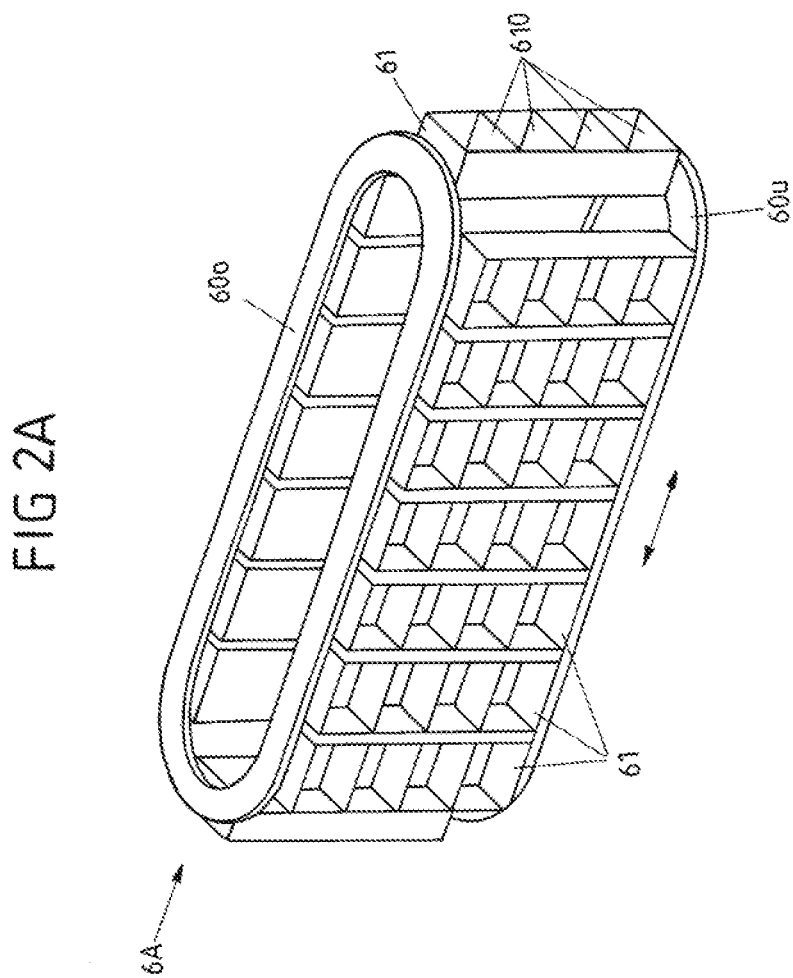

STORAGE DEVICE FOR A VEHICLE WITH AN IMAGE-CAPTURING DEVICE

CROSS-REFERENCE TO A RELATED APPLICATION

This application is a National Phase Patent Application of International Patent Application Number PCT/EP2014/077108, filed on Dec. 10, 2014, which claims priority of German Patent Application Number 10 2013 225 670.1, filed on Dec. 11, 2013.

BACKGROUND

The present invention relates to a storage device and to a method for making available at least one of a plurality of compartments of a storage device.

Different storage devices for a vehicle, having a plurality of compartments for storing objects, are known from the prior art. Such storage devices are integrated, for example, into central consoles and are provided underneath central armrests. The (storage) compartments of these storage devices can be of different sizes and contain receptacles for, for example, drinks cans, writing utensils or the like. Depending on the design of the central consoles, the compartments are of relatively deep design and are therefore relatively unfavorable in terms of finding objects stored in them during travel. Searching for a specific object within the respective compartment is frequently only possible without a user being able to look in the compartment, in particular during travel. In this way as such, there is a need to identify the searched-for object through tactile recognition.

DE 100 27 373 A1 in turn discloses a storage device for a vehicle, which storage device can be integrated, for example, into a central console and in which a plurality of storage units, each having a compartment for receiving objects, can be adjusted by means of an adjustment device within a closed-off receptacle space of the storage device. The individual storage units can be moved to a removal opening at a user's request by means of a motor-operated drive of the adjustment device, with the result that the desired storage unit and the compartment thereof are then accessible to a user via this removal opening. Such a storage device ensures at least that different types of objects can be stored in a classified fashion in different storage units. The adjustment of the individual drive units within the receptacle space of the storage device is achieved, for example, by means of a circulating drive element, for example a belt, a ribbon or a chain to which the individual storage units can be coupled.

SUMMARY

On the basis of the specified prior art, the present invention is based on the object of improving further a storage device for a vehicle, and, in particular, of making it easier for a user to find a specific object within the storage device.

This object is achieved with a storage device as described herein and with a method as described herein.

In this context, a storage device for a vehicle has a plurality of compartments for storing objects and comprises, in particular:
a receptacle space with a removal opening,
at least one storage unit which is accommodated inside the receptacle space and has at least one compartment,
an adjustment device by means of which the at least one storage unit can be adjusted within the receptacle space, with the result that whether a specific compartment of the storage device is accessible to a user via the removal opening depends on the position of the storage unit.

In this context, it is possible to provide different compartments in a storage unit and/or different compartments in different storage units.

For example, each adjustable storage unit can therefore have a plurality of compartments or even only precisely one compartment.

According to the invention, the storage device additionally has
an electronic memory and an image-capturing device by means of which at least one image of contents of one of the compartments can be produced and stored in the memory, and
an electronic control unit by means of which an image which is produced by the image-capturing device and stored in the memory can be displayed on a display device, wherein by means of the control unit a specific compartment which is selected by a user—preferably via the display device—can additionally be made accessible to the user via the removal opening with the aid of the adjustment device.

In this way, it is made considerably easier for a user to find a specific object within the storage device, and also to find a still empty compartment in which the user can place an object. The respective contents of the compartments which are present in the storage device are therefore displayed to the user via the display device, with the result that the user is visually informed on the display device as to whether an object and, if appropriate, which object or objects is/are present within the respective compartment. By means of the control unit it is possible to make a selected compartment accessible to the user via the removal opening, with the result that the user can remove an object from this compartment and/or place an object in the compartment. If, after the selection of a specific compartment by the user, the storage unit which is associated with the selected compartment is not yet in an adjustment position in which this compartment is accessible via the removal opening, the control device actuates the adjustment device for this purpose such that the storage unit is correspondingly adjusted within the receptacle space.

In one embodiment variant, a compartment which is associated with a stored image can be selected by the user directly via the display device, and the selected compartment is made accessible to the user via the removal opening by means of the control unit. The display device therefore provides a possibility for the user to make inputs, in order to select a compartment on the basis of an image of the content of the respective compartment which is displayed, preferably at that particular time on a screen of the display device, and automatically to move a storage unit or a plurality of storage units of the storage device, in such a way that this compartment is accessible to the user. The display device can, for example, comprise a touchscreen for this purpose.

The control unit preferably has control electronics which automatically trigger the production of an image by means of the image-capturing device if the occurrence of at least one predefined operator control event has been detected. This is understood to mean, for example, that it is detected if a user places an object in a compartment or removes an object from a compartment and the image-capturing device then automatically produces an image of this compartment, in order to be able to inform the user later on the display device about the current content of said compartment.

In one exemplary embodiment, the removal opening can be closed by an adjustable closure element, for example by means of an armrest in the case of a central console. In this context, the control electronics are designed and provided to trigger the production of an image of the content of that compartment which is accessible via the removal opening when the closure element is adjusted into an open position and subsequently into a closed position in which the removal opening is closed by the closure element. In such a way, the production of an image is triggered, in particular by an adjustment of a closure element of the storage device, with the result that whenever a compartment could be equipped with a new object or an object could be removed from this compartment, an updated image of the content thereof is generated and stored.

In this context, it is, of course, also possible to provide that the content of different compartments which are accessible, or are made accessible, via the removal opening in an open position of the closure element is sensed successively or simultaneously. It is therefore possible, for example, for a user to activate the adjustment device in an open position of the closure element and to adjust the storage unit/units of the storage device, with the result that the content of different compartments can therefore be changed in an open position of the closure element. In such an exemplary embodiment, it is also intended to ensure by means of the control unit that the respective current content of the compartments is documented by the image-capturing device and can be retrieved via the display device.

A display device is preferably provided within the vehicle. A display device can comprise, for example, a display on a central console, a display on the dashboard of the vehicle and/or a head-up display of the vehicle.

Alternatively or additionally, a display device can be used outside the vehicle. Said device may be, for example, a display which can be removed from the vehicle or a mobile terminal such as, for example, a smartphone. In such a way, a user can check, for example by means of an app on his smartphone as an external display device, which objects are accommodated in the storage device of his vehicle, and whether he has possibly forgotten a specific object in the vehicle. In this context, one embodiment variant can be provided in which, on the display device which can be used outside the vehicle, it is not possible to make a selection of a specific compartment in order to make said compartment available at the removal opening, but instead information for the user about the content of the individual compartments of the storage device within the vehicle is merely made possible by means of the displayed images. Therefore, while the contents of the compartments can be seen, for example, by means of a display which is fixed to the vehicle and/or an internal display of a first display device and the adjustment device of the storage device can be actuated, only the contents of the compartments can be seen via an additional, second external display device.

In one development there is provision that the images which are produced by the image-capturing unit of the storage device and stored can be retrieved on a mobile terminal, and the storage device comprises for this purpose means for wireless communication between the mobile terminal and the control unit. For example, the electronic control unit can itself comprise for this purpose means, for example in the form of a transceiver device, for communicating in a wireless fashion with the mobile terminal. The means here can each be provided, for example, for communication via a network (LAN), via a mobile radio network (GSM, UMTS, LTE, etc.) and/or Bluetooth.

In one embodiment variant in addition an input device is provided by means of which a user can make an input to the content of the respective compartment and store it. The input can be made here, for example, in a text form and/or as a voice input. The user can therefore store information additional to the content of the respective compartment in the memory, which information makes it easier later to find a desired object which is stored in the compartment.

It is accordingly also possible to provide that inputs which are made to the individual compartments and stored can be searched through by a user by means of the control unit, in order to be able to search for a specific input. In this way, a user can store, for example for a specific compartment in addition to the stored image, a text—for example "ice scraper", "torch", "driving license", "drinks" etc.—and can later have the images relating to said compartments for which a corresponding input has been made displayed to him via the display device. It is therefore possible for a user to have, for example, all the compartments which contain drinks displayed on a display of the display device.

The adjustment device of the storage device can comprise at least one circulating drive element, which is preferably deflected at least twice, for adjusting the at least one storage unit. The drive element is embodied, for example, as a belt, ribbon or chain. An adjustment device with such a drive element is usually defined by a high level of reliability and the possibility of a particularly space-saving and cost-effective design. For example, belt drives and chain drives for an adjustment device are widely known and can be of very compact design, in order to be able to adjust a plurality of storage units within a storage space. The individual storage units can be accommodated and be adjustable here, for example, in the manner of a paternoster in the storage space.

A plurality of storage units of a storage device can consequently be coupled to the at least one circulating drive element and be arranged one behind the other with respect to a direction of circulation of the drive element. Since a drive motor of the adjustment device is then actuated for a correspondingly long time, a specific storage unit with the compartment which is selected by a user can be positioned in such a way that its compartment is present in the region of the removal opening and the compartment is accessible to a user via the removal opening.

In one embodiment variant, the storage device is integrated into a central console of a vehicle. However, it is, of course, also conceivable to provide a storage device according to the invention at another location within a vehicle and as a result to accommodate various objects in a classified and, if appropriate, catalogued fashion in a relatively small storage space with the different compartments of the storage device. However, in this context the emphasis is always on the fact that image information relating to the content of the individual compartments is available to a user on a display device, and the user therefore easily and quickly has an overview of the objects accommodated in the storage device.

A further aspect of the present invention is a method for making available at least one of a plurality of compartments of a storage device for a vehicle, with the result that said compartment is accessible to a user for removing an object from the compartment and/or for storing an object in the compartment.

A storage device which is used within the scope of this method has accordingly, in a fashion analogous to the above statements, at least one receptacle space with a removal opening, at least one storage unit which is accommodated inside the receptacle space and has at least one compartment, and an adjustment device for adjusting the storage unit/units within the receptacle space.

In a method according to the invention there is then provision that at least one image of contents of each compartment of the storage device is produced and stored, and the stored images are displayed on a display device, with the result that a user can select a specific compartment on the basis of a displayed image, and a compartment which is selected by the user is made accessible via the removal opening by means of the adjustment device.

A method according to the invention therefore provides an improved option for providing a user with a visual impression of the content of a storage device having at least one adjustable storage unit. In this context, a compartment which is selected by the user on the display device is positioned with the aid of the adjustment device in such a way that said compartment is accessible to the user.

In a method according to the invention, it is, of course, possible for a storage device according to the invention to be used. The advantages and features explained above for exemplary embodiments of a storage device according to the invention therefore also apply to a method according to the invention, and vice versa.

BRIEF DESCRIPTION OF THE DRAWINGS

Further advantages and features of the present invention will become clear from the following description of exemplary embodiments with reference to the figures.

FIGS. 2A-2B each show, in a perspective view, different embodiment variants of storage units of a storage device which are mounted so as to be adjustable by means of a circulating drive element which is deflected twice.

DETAILED DESCRIPTION

Figure 1:
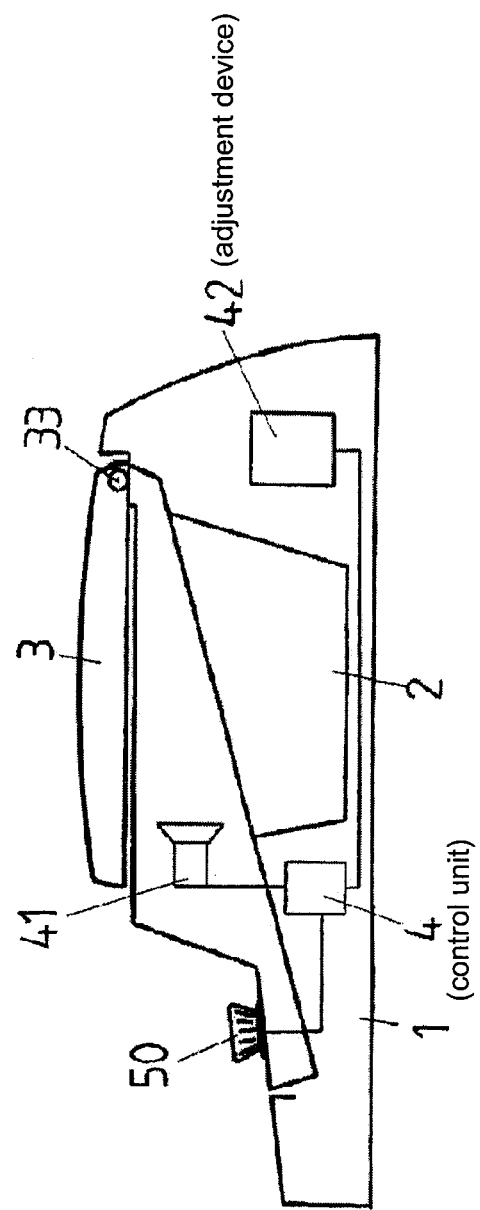
FIG. 1 is a schematic view of a storage device which is integrated into a central console and has a camera, arranged within the central console, as an image-capturing device.

FIG. 1 shows a schematic, sectional side view of a storage device which is integrated into a central console 1. Within the central console 1 a receptacle space 2 of the storage device is formed, said receptacle space 2 having a removal opening on its upper side. This removal opening can be closed by means of a closure element in the form of an armrest 3 which is mounted so as to be pivotable about a pivoting axis 33.

A plurality of storage units (not illustrated in FIG. 1) of the storage device, which can be adjusted by means of an adjustment device 42 with a motor-operated drive, are accommodated within the receptacle space 2. Each of these storage units forms at least one compartment for receiving an object and can be moved within the receptacle space 2 by means of the adjustment device 42 in such a way that the compartment or compartments of said storage unit are present underneath the armrest 3 of the central console 1 and are therefore accessible via the removal opening.

The adjustment device 42 is controlled by means of an electronic control unit 4 with integrated control electronics and a memory. A user can adjust the storage units within the receptacle space 2 by means of a control element in the form of an operator control knob 50, coupled to the control unit 4, on the central console 1, with the result that a desired compartment is accessible on the upper side of the central console 1, and a user can by this means remove an object from the respective compartment or place an object in this compartment. Control instructions which are input by means of the operator control knob 50 are evaluated here by the control unit 4 and used to control the adjustment device 42. A storage device which is functionally comparable in this respect and which is integrated into a central console is moreover known from DE 100 27 373 A1.

The exemplary embodiment according to the invention also has an image-capturing device which is integrated into the central console 1 and is in the form of a camera 41. The camera 41 automatically takes images of the compartments of the storage device and stores them in a memory of the control unit 4. The compartments can be moved past the camera 41 here and/or the camera 41 is positioned for this purpose within the receptacle space 2 in such a way that a compartment which is (currently) accessible via the removal opening on the upper side of the central console 1 is located opposite the camera 41. In any case, the control unit 4 actuates the camera 41 in such a way that an image of the content of each compartment of the storage device is present and/or at least one item of information is available as to whether an object is located in the respective compartment or not. For example, an image of the content of a compartment can be produced by means of the camera 41 if the compartment has been moved for the first time into a removal position in which it is accessible via the removal opening. In this way, a recording of the content of the respective compartment is not made until there is also the possibility that an object has been stored herein.

Preferably, just one current image, which can be retrieved via a display device within and/or outside the vehicle, is always stored in the memory of the control unit 4 for each compartment of the storage device. However, in one development, a plurality of images can be stored for a compartment, wherein an image shows the current content of the respective compartment, and the further images show previous contents of the same compartment at earlier times. In such a way, it is possible for a user to use the stored images to find out, for example, when a specific object has been removed from a compartment.

Figure 2B:
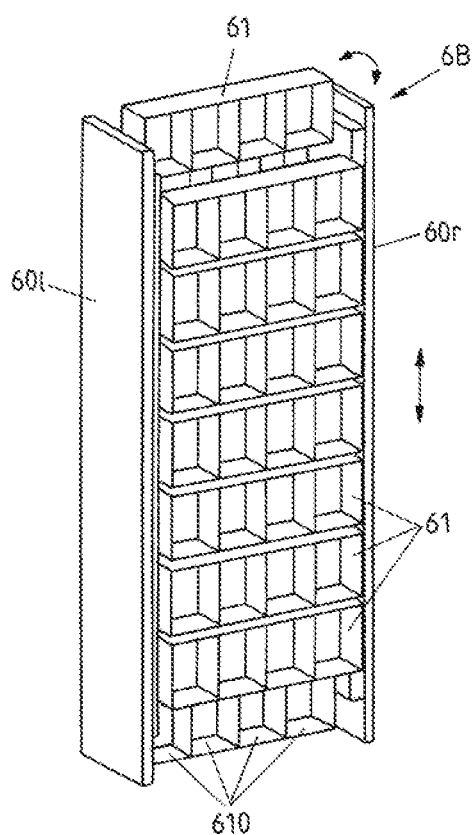

FIGS. 2A and 2B illustrate different exemplary embodiments of storage units 6A and 6B which are to be accommodated in the receptacle space 2. Each storage unit 6A or 6B has a plurality of storage units in the form of storage cartridges 61 with a plurality of compartments 610 which are arranged one on top of the other or one next to the other. The individual storage cartridges 61 are held here in each case between two guide elements 60*o*, 60*u* or 60*l*, 60*r*.

In the case of the storage unit 6A according to FIG. 2A, the individual storage cartridges 61, which are illustrated here with a square shape, are arranged between an upper guide element 60*o* and a lower guide element 60*u* which form the upper and lower sides of the storage unit 6A and between which the storage cartridges 61 are guided in an adjustable fashion. The guide elements 60*o* and 60*u* each have two rounded ends lying opposite one another. At least one elongated, circulating drive element, for example a belt, a ribbon or a chain, is guided within the guide elements 60o and 60u or along them and is deflected at the two rounded ends. The individual storage cartridges 61 are each coupled to this drive element, with the result that by driving the drive element or elements it is possible to adjust the storage cartridges 61 which are arranged one behind the other, with respect to the direction of extent and the circulation direction of the drive element.

In the case of the storage unit 6B in FIG. 2B, the individual storage cartridges 61 are held between two lateral guide elements 60l and 60r. At least one circulating drive element to which the individual storage cartridges 61 are coupled is also arranged here on the guide elements 60l and 60r. The storage cartridges 61 of the storage unit 6B are arranged here on the lateral guide elements 60l and 60r and driven by the at least one drive element in such a way that the storage cartridges 61 are adjusted in the manner of a paternoster. The individual storage cartridges 61 are therefore guided on the guide elements 60l and 60r and coupled in an articulated fashion to the at least one circulating drive element in such a way that the storage cartridges 61 always remain oriented in the same way in respect of a vertical during circulation.

A multiplicity of different objects can be accommodated in the various compartments 610 by means of the storage units 6A and 6B, illustrated by way of example in FIGS. 2A and 2B, within a receptacle space 2 of the central console 1. Depending on the position of the storage cartridges 61, one of the storage cartridges 61 is present with its plurality of compartments 610 at the removal opening, closed by the armrest 3, of the storage device, in such a way that a user can place objects in the compartments 610 or remove them therefrom.

Figure 3:
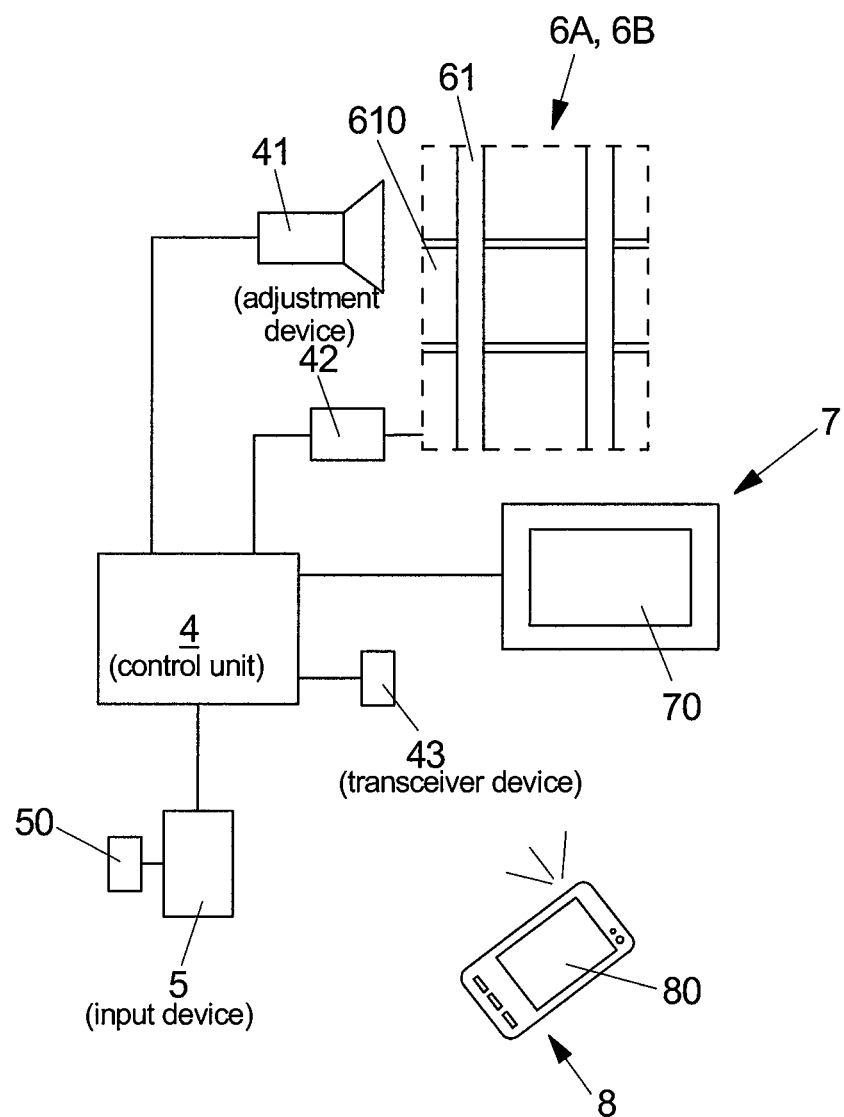
FIG. 3 is a schematic view of the design of a storage device according to the invention with a transceiver device for wireless communication with a mobile terminal.

As is illustrated schematically in FIG. 3, in this context an image is produced of the content of a respective compartment 610 by means of the camera 41 and stored, and said image is made available in a retrievable fashion by the control unit 4 on a display device in the form of a display unit 7 within the vehicle. The display unit 7 which is arranged within the vehicle has a screen 70 which is arranged, for example, on the central console 1 or on the dashboard of the vehicle. By selecting an image of the content of the respective compartment 610 which is displayed on the screen 70 it is possible to select this compartment 610. The control unit 4 then causes a drive of the adjustment device 42 to adjust the respective storage cartridge 41 in such a way that the selected compartment 610 is accessible at the removal opening underneath the armrest 3.

Alternatively or additionally, the adjustment device 42 can be actuated by means of an electronic input device which comprises, for example, the operator control knob 50, in order to adjust a specific compartment 610 or a specific storage cartridge 61 within the receptacle space 2 in such a way that access is provided to the user if the user pivots the armrest 3 into an open position.

Furthermore, by means of the input device 5 it is possible for a user to make an input in order to describe the content of a compartment 610 in more detail and/or to be able to search through the memory of the control unit 4 more easily. In this way, a user can use the input device 5 to input, for example, a text which describes an object which is stored in a compartment 610 after the object has been placed in the respective compartment 610. The associated compartment 610 can then be selected later by searching for the term used, for example also by naming the term with voice control means which are made available by the input device 5.

Furthermore, the control unit 4 in FIG. 3 has a transceiver device 43 by means of which wireless communication with a mobile device 8, for example in the form of a smartphone, is possible. The mobile device 8 has a screen 80 via which the images relating to the content of the individual compartments 610, which are stored in the memory of the control unit 4, can likewise be retrieved. In such a way, a user can also consider the content of the individual storage cartridges 61 from outside the vehicle, for example via a corresponding software application (usually abbreviated to "app") which is installed on the mobile device 8, in order, for example, to determine whether he has forgotten something in it.

In one development, control instructions can also be transmitted to the control unit 4 via the mobile device 8 in order to adjust the storage cartridges 61 and move them past the camera 41. As a result, a user can search through the individual compartments 610 in real time from a distance. In order to reduce the data to be transmitted, it is, however, considered more advantageous if on the mobile device 8 (also) only the images relating to the content of the individual compartments 610 which have already been produced by the camera 41 and are stored in the memory of the control unit 4 can be displayed on the screen 80 of the mobile device 8. For this purpose, for example, also one operating mode of at least two operating modes can be provided in the corresponding software application for the mobile device 8; a first operating mode for considering the compartment contents in real time, if appropriate with a control facility for the adjustment device 42, and a second operating mode for considering the stored images exclusively.

Figure 4A:
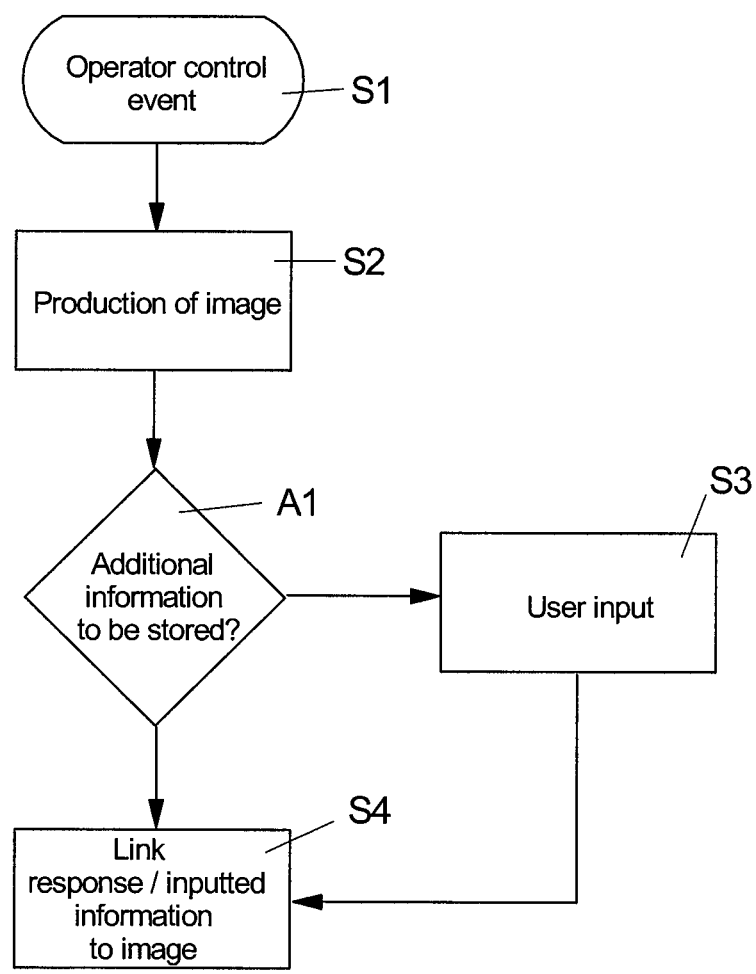
FIG. 4A shows a flow chart relating to the method of functioning of an exemplary embodiment of a storage device according to the invention when a new object is placed in a compartment.
Figure 4B:
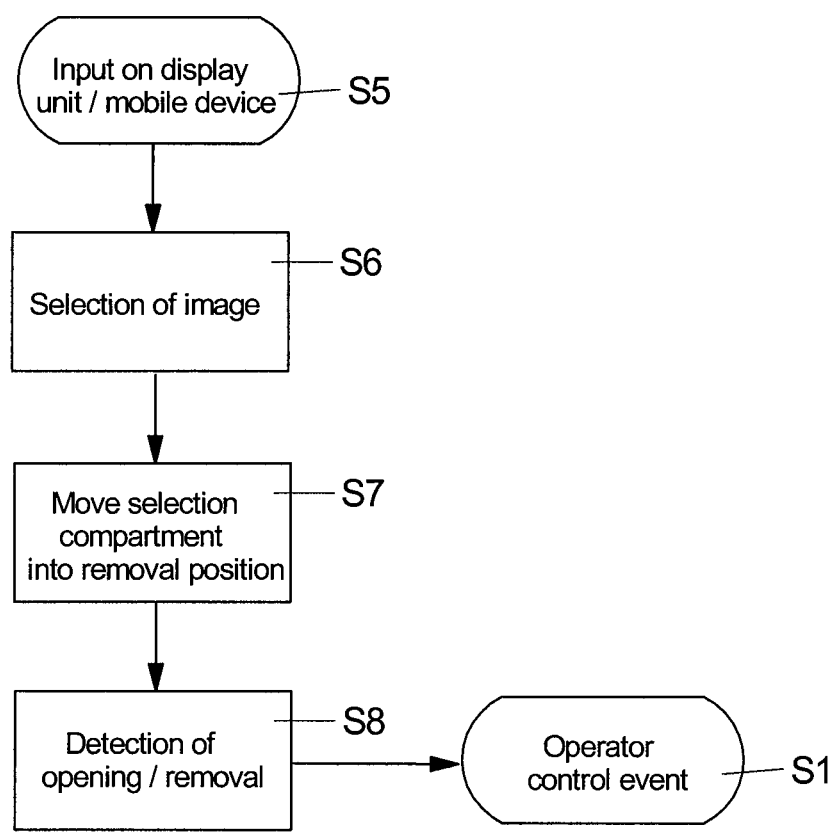
FIG. 4B shows a further flow chart relating to the method of functioning of an exemplary embodiment of a storage device according to the invention during the selection of a specific compartment by a user.

FIGS. 4A and 4B illustrate, for example, flow charts which are intended to clarify a possible method of functioning of a storage device according to the invention, which storage device is integrated, for example, in the central console 1 of FIG. 1. In this context, individual steps which are executed when a new object is placed in a compartment 610 of the storage device are illustrated with FIG. 4A. FIG. 4B illustrates in turn individual method steps during the selection of a specific compartment 610 by a user on a display device such as, for example, the display unit 7 or the mobile device 8, and the making available of the selected compartment at a removal opening underneath the armrest 3.

In the flow chart in FIG. 4A, the opening of the armrest 3 is firstly detected as an operator control event in a first step S1. For this purpose, for example corresponding movement sensors and/or optical sensors and/or electrical contacts are provided on the central console 1.

Directly after the opening of the armrest 3, after a defined time period after the opening of the armrest 3 or even also after the closing of the armrest 3, the production of an image of the compartment or the plurality of compartments 610 present at the removal opening is triggered by the camera 41 by means of the control electronics of the control unit 4 in a subsequent step S2. The image or the images of the content of the compartment or compartments 610 is/are stored in the memory of the control unit 4, with the result that this image or these images can be retrieved in order to provide the user with information on the display unit 7 and/or the mobile device 8.

During a subsequent interrogation A1, it is interrogated, by means of the control electronics of the control unit 4, whether the user wishes to store additional information relating to the content of a compartment 610, currently accessible via the removal opening, or an object currently stored therein, in the memory. In this context, the user can, for example, input a text or record a voice message, in order to describe the content of the compartment.

If the user responds to the interrogation A1 with a positive response, in a subsequent step S3 it is possible to make a corresponding input via the input device 5, the display unit 7 or the mobile device 8. In one exemplary embodiment, a user can also make a selection from a plurality of already predefined key words for this purpose.

In a subsequent step S4, the additionally input information is then linked to the stored image relating to the respective compartment, with the result that said information is available to a user. If the interrogation A1 has received a negative response, in the step S4 it is merely noted in the memory that no additional information has been stored for the respective compartment or image.

The functional schema in FIG. 4B in turn starts, in a step S5, with an input on the display unit 7 or the mobile device 8, to display images relating to the content of the individual compartments 610.

In a subsequent step S6, a user selects a specific image, and therefore a specific compartment 610, on the screen 70 or 80.

Subsequently, in a method step S7, the control unit 4 actuates a drive motor of the adjustment device 42, in order to move the selected compartment 610 into a removal position, with the result that the compartment 610 is accessible via the removal opening when the armrest 3 is folded open.

In a subsequent step S8, the opening and, if appropriate, the removal of an object from the compartment 610 is then detected. This can then be followed by the functional sequence according to FIG. 4A, in order to capture again a new image of the compartment 610 which has just been made accessible.

With the solution according to the invention it is therefore possible to make, in particular, an automatically triggered recording of the content of individual compartments 610 which are provided on storage cartridges 61 which are mounted adjustably within the receptacle space 2, as well as the display of the respective content on a separate screen 70 on the central console 1 or on a main screen on a dashboard and, if appropriate, additionally on a screen of a mobile device 8. In this context, a desired compartment 610 can also be selected directly via the respective screen 70 or 80. Furthermore, the contents of the individual compartments 610 can be catalogued in a simple and attractive way, and user inputs can be added to said contents. In this context, the control unit 4 can for this purpose also comprise means for voice control of the system.

LIST OF REFERENCE SYMBOLS

1 Central console
2 Receptacle space
3 Armrest (closure element)
33 Pivoting axis
4 Control unit
41 Camera (image-capturing device)
42 Adjustment device
43 Transceiver device
5 Input device
50 Operator control knob (control element)
60*o*, 60*u*, Guide element
60*l*, 60*r*
61 Storage cartridge (storage unit)
610 Compartment
6A, 6B Storage unit
7 Display unit (display device)
70 Screen
8 Mobile device (display device)
80 Screen
A1 Interrogation
S1-S8 Method steps

The invention claimed is:

1. A storage device for a vehicle, the storage device having a plurality of compartments for storing objects and comprising at least the following:
   a receptacle space with a removal opening,
   at least one storage unit which is accommodated inside the receptacle space and has at least one compartment,
   an adjustment device via which the at least one storage unit can be adjusted within the receptacle space, wherein whether a specific compartment of the storage device is accessible to a user via the removal opening depends on a position of the storage unit,
   an electronic memory and an image-capturing device via which at least one image of contents of one of the compartments can be produced and stored in the memory, and
   a control unit via which an image which is produced by the image-capturing device and stored in the memory can be displayed on a display device, and via which a specific compartment which is selected by a user can be made accessible to the user via the removal opening with the aid of the adjustment device,
   wherein the control unit has control electronics which automatically trigger the production of an image via the image-capturing device if the occurrence of at least one predefined operator control event has been detected, and
   wherein the removal opening can be closed by an adjustable closure element, and the control electronics are designed and provided to trigger the production of an image of the content of that compartment which is accessible via the removal opening when the closure element is adjusted into an open position and subsequently into a closed position in which the removal opening is closed by the closure element.

2. The storage device as claimed in claim 1, wherein a compartment which is associated with a stored image can be selected by the user via the display device, and the selected compartment is made accessible to the user via the removal opening via the control unit.

3. The storage device as claimed in claim 1, wherein the display device is located within the vehicle.

4. The storage device as claimed in claim 1, wherein the display device can be used outside the vehicle.

5. The storage device as claimed in claim 4, wherein a mobile terminal comprises the display device, and a wireless communicator for wireless communication between the mobile terminal and the control unit is provided.

6. The storage device as claimed in claim 1, wherein an input device is provided via which a user can make an input relating to the content of the respective compartment and store it.

7. The storage device as claimed in claim 6, wherein inputs which are made to the individual compartments are stored and can be searched through by a user via the control unit, in order to be able to search for a specific input.

8. The storage device as claimed in claim 1, wherein the adjustment device comprises at least one circulating drive element for adjusting the at least one storage unit.

9. The storage device as claimed in claim 8, wherein the storage device comprises a plurality of adjustable storage units which are coupled to the at least one circulating drive element and are arranged one behind the other with respect to a direction of circulation of the drive element.

10. The storage device as claimed in claim 1, wherein the storage device comprises a plurality of adjustable storage units, and/or an adjustable storage unit has a plurality of compartments.

11. The storage device as claimed in claim 1, wherein the storage device is integrated into a central console of a vehicle.

12. A method for making available at least one of a plurality of compartments of a storage device for a vehicle, wherein said compartment is accessible to a user, wherein the storage device comprises at least the following:
   a receptacle space with a removal opening,
   at least one storage unit which is accommodated inside the receptacle space and has at least one compartment, and
   an adjustment device via which the at least one storage unit can be adjusted within the receptacle space, wherein whether a specific compartment of the storage device is accessible to a user via the removal opening depending on the position of the storage unit, wherein the method comprises:
   producing and storing at least one image of contents of the at least one compartment,
   displaying any stored images on a display device, so that the user can select a specific compartment on the basis of a displayed image, and
   making a compartment, which is selected by the user, accessible through the removal opening via the adjustment device,
   wherein the production of an image is automatically triggered if the occurrence of at least one predefined operator control event has been detected, and
   wherein the removal opening can be closed by an adjustable closure element, and the production of an image of the content of that compartment which is accessible via the removal opening is triggered when the closure element is adjusted into an open position and subsequently into a closed position in which the removal opening is closed by the closure element.

13. A storage device for a vehicle, the storage device having a plurality of compartments for storing objects and comprising at least the following:
   a receptacle space with a removal opening,
   at least one storage unit which is accommodated inside the receptacle space and has at least one compartment,
   an adjustment device via which the at least one storage unit can be adjusted within the receptacle space, wherein whether a specific compartment of the storage device is accessible to a user via the removal opening depending on a position of the storage unit,
   an electronic memory and an image-capturing device via which at least one image of contents of one of the compartments can be produced and stored in the memory, and
   a control unit via which an image which is produced by the image-capturing device and stored in the memory can be displayed on a display device, and via which a specific compartment which is selected by a user can be made accessible to the user via the removal opening with the aid of the adjustment device,
   wherein the display device can be used outside the vehicle and a mobile terminal comprises the display device, and
   wherein a wireless communicator for wireless communication between the mobile terminal and the control unit are provided.

14. A storage device for a vehicle, the storage device having a plurality of compartments for storing objects and comprising at least the following:
   a receptacle space with a removal opening,
   at least one storage unit which is accommodated inside the receptacle space and has at least one compartment,
   an adjustment device via which the at least one storage unit can be adjusted within the receptacle space, wherein a specific compartment of the storage device is accessible to a user via the removal opening depends on a position of the storage unit,
   an electronic memory and an image-capturing device via which at least one image of contents of one of the compartments can be produced and stored in the memory, and
   a control unit via which an image which is produced by the image-capturing device and stored in the memory can be displayed on a display device, and via which a specific compartment which is selected by a user can be made accessible to the user via the removal opening with the aid of the adjustment device,
   wherein an input device is provided via which a user can make an input relating to the content of the respective compartment and store it, and
   wherein inputs which are made to the individual compartments are stored and can be searched through by a user via the control unit, in order to be able to search for a specific input.

15. A storage device for a vehicle, the storage device having a plurality of compartments for storing objects and comprising at least the following:
   a receptacle space with a removal opening,
   at least one storage unit which is accommodated inside the receptacle space and has at least one compartment,
   an adjustment device via which the at least one storage unit can be adjusted within the receptacle space, wherein whether a specific compartment of the storage device is accessible to a user via the removal opening depending on a position of the storage unit,
   an electronic memory and an image-capturing device via which at least one image of contents of one of the compartments can be produced and stored in the memory, and
   a control unit via which an image which is produced by the image-capturing device and stored in the memory can be displayed on a display device, and via which a specific compartment which is selected by a user can be made accessible to the user via the removal opening with the aid of the adjustment device,
   wherein the storage device is integrated into a central console of a vehicle.

* * * * *